(12) United States Patent
Blount et al.

(10) Patent No.: US 7,562,314 B2
(45) Date of Patent: Jul. 14, 2009

(54) DATA PROCESSING APPARATUS AND METHOD

(75) Inventors: Alan Blount, Somerville, MA (US);
Todd Pinkerton, Somerville, MA (US)

(73) Assignee: Orange SA, Paris (FR)

( * ) Notice: Subject to any disclaimer, the term of this patent is extended or adjusted under 35 U.S.C. 154(b) by 470 days.

(21) Appl. No.: 10/841,287

(22) Filed: May 7, 2004

(65) Prior Publication Data

US 2004/0223647 A1    Nov. 11, 2004

(30) Foreign Application Priority Data

May 8, 2003    (EP)    ................................. 03291098

(51) Int. Cl.
*G06F 3/033* (2006.01)
*G06K 9/00* (2006.01)

(52) U.S. Cl. ....................... 715/863; 382/187; 382/179; 345/173; 345/179

(58) Field of Classification Search ................. 715/863, 715/531, 764, 800, 221–226, 830; 345/173, 345/179; 382/187, 186, 189, 321, 177, 179, 382/181
See application file for complete search history.

(56) References Cited

U.S. PATENT DOCUMENTS

| | | | | |
|---|---|---|---|---|
| 5,121,442 A | | 6/1992 | Togawa et al. ................. | 382/13 |
| 5,500,937 A | * | 3/1996 | Thompson-Rohrlich .... | 715/764 |
| 5,566,248 A | * | 10/1996 | Ulrich ......................... | 382/187 |
| 5,677,710 A | * | 10/1997 | Thompson-Rohrlich .... | 345/173 |
| 5,682,439 A | * | 10/1997 | Beernink et al. ............. | 382/187 |
| 5,732,152 A | * | 3/1998 | Sakai et al. ................... | 382/189 |
| 5,778,404 A | * | 7/1998 | Capps et al. ................. | 715/531 |
| 5,903,666 A | * | 5/1999 | Guzik et al. ................. | 382/179 |

(Continued)

FOREIGN PATENT DOCUMENTS

JP    06-168237    6/1994

(Continued)

OTHER PUBLICATIONS

David Goldberg and Aaron Goodisman; "Stylus User Interfaces for Manipulating Text", Nov. 11-13, 1991, pp. 127-135.

*Primary Examiner*—Tadeese Hailu
(74) *Attorney, Agent, or Firm*—Haverstock & Owens LLP

(57) ABSTRACT

A data processing apparatus for inputting data by writing characters on a touch sensitive display screen. The data processing apparatus comprises a character recognition processor operable to generate an estimate of a character hand written by a user on the touch sensitive screen. The data processing apparatus includes a processing unit operable to receive the estimated character, and a graphics display device operable to receive the estimated character from the processing unit. The graphics display device is operable to display the estimated characters within a text input window of the display screen. The processing unit is operable in combination with the graphics display driver to display the estimated character on the display screen, substantially at a position proximate to a location to where the user has written the character. As a result, text data can be input more efficiently because a user is provided with feedback of the recognise character in a position which corresponds to where the character has just been written. The efficiency results at least in part because a user is not required to change his or her focus of attention between the position where the text is written and the position where the estimated character is displayed.

14 Claims, 5 Drawing Sheets

U.S. PATENT DOCUMENTS

| | | | |
|---|---|---|---|
| 6,005,973 A | 12/1999 | Seybold et al. | 382/187 |
| 6,282,315 B1* | 8/2001 | Boyer | 382/177 |
| 6,642,458 B2* | 11/2003 | Panagrossi III et al. | 178/18.01 |
| 6,661,409 B2* | 12/2003 | Demartines et al. | 345/173 |
| 6,791,537 B1* | 9/2004 | Shim et al. | 345/173 |
| 6,952,803 B1* | 10/2005 | Bloomberg et al. | 715/530 |
| 7,013,046 B2 | 3/2006 | Kawamura et al. | 382/186 |
| 7,120,275 B2* | 10/2006 | Landstad et al. | 382/100 |
| 7,137,076 B2* | 11/2006 | Iwema et al. | 715/863 |
| 2002/0027550 A1 | 3/2002 | Frink et al. | 345/179 |
| 2002/0114516 A1* | 8/2002 | Aharonson | 382/181 |
| 2003/0001899 A1* | 1/2003 | Partanen et al. | 345/800 |
| 2003/0156099 A1* | 8/2003 | Yrjanainen et al. | 345/173 |
| 2003/0214531 A1* | 11/2003 | Chambers et al. | 345/764 |
| 2004/0104936 A1* | 6/2004 | Guo et al. | 345/764 |
| 2005/0152601 A1* | 7/2005 | Chen et al. | 382/187 |
| 2005/0220344 A1* | 10/2005 | Akiyama | 382/187 |

FOREIGN PATENT DOCUMENTS

| | | |
|---|---|---|
| JP | 09-006919 | 1/1997 |
| JP | 2001-357354 | 12/2001 |

* cited by examiner

DATA PROCESSING APPARATUS AND METHOD

FIELD OF THE INVENTION

The present invention relates to data processing apparatus and methods, which are arranged to input data in the form of hand written text.

BACKGROUND OF THE INVENTION

Data processing apparatus such as for example Personal Digital Assistants (PDA) and mobile communications devices can include a facility for inputting text information by hand-writing alpha-numeric characters on a touch sensitive screen. The alpha-numeric characters are recognised by a character recognition processor. The recognised characters are usually reproduced on the screen in a dialogue box or text input window. Generally, since the area required by a human hand to write a character is larger than an area required to display the recognised characters, the text is displayed in a smaller form, which is displaced from the position where the user is inputting characters by hand-writing.

An article entitled "Stylus User Interfaces for Manipulating Text", by D Goldberg et al, published on 11 Nov. 1991, at UIST'91, Proceedings of the ACM Symposium on User Interface Software and Technology pages 127-135 (XP000315073) discloses a text input processing apparatus by recognising hand written characters. The characters are written on a touch sensitive screen. A character recognition processor is arranged to estimate the hand written character, and a processing unit is arranged to receive the estimated character and to display the estimated character in the place of the hand written character on the touch sensitive screen.

U.S. Patent application No. US 2002/0027550A1 published on 7 Mar. 2002 discloses a computer system in which text is arranged to be input by recognising hand written characters. A user hand writes characters of text to be input on a tablet input grid. The hand written text is displayed on a first part of the computer screen. A character recognition processor generates an estimate of the hand written characters in the form of ASCI characters and reproduces the estimated characters at an insertion point of a word processing document in a different part of the computer screen.

An object of the present invention is to provide a more efficient facility for inputting characters by writing the characters on a touch sensitive screen.

SUMMARY OF INVENTION

According to the present invention there is provided a data processing apparatus for inputting data by hand writing characters on a touch sensitive display screen. The data processing apparatus comprises a character recognition processor operable to generate an estimate of a character hand written by a user on a handwriting area of the touch sensitive screen, a processing unit operable to receive the estimated character generated by the character recognition processor, and a graphics display driver. The graphics display driver is operable to receive the estimated character from the processing unit and to display the estimated character within a text-input window of the display screen the text input window being displaced from the handwriting area of the display screen. The processing unit is operable in combination with the graphics display driver to display the estimated character on the display screen substantially where the character was written in the handwriting area for a predetermined persistence time, the predetermined persistence time being limited.

Conventional data processing apparatus that include a facility for inputting data in the form of hand written text, generally arrange for the characters estimated as the characters written, to be reproduced in a text window which is displaced from an area where the user writes the characters. One reason for this displacement is that the size of a character which the human hand is able to write is typically larger than a size that a text character can be recognised by the human eye. As such, the recognised text is conventionally reproduced within a text window, which is displaced from an area where the user writes the characters to be input and are typically smaller in size.

Embodiments of the present invention find application with data processing apparatus for use in for example Personal Digital Assistants (PDA) or a mobile communications device, and can provide a more efficient facility for inputting characters by writing the characters on a touch sensitive screen. By displaying an estimated character on the display screen at a position where the user has written the character, a confirmation of the recognised character is provided in a way which does not make the user change a focus of the user's attention to a different location. As a result, an improvement is provided by increasing a rate at which a user can input text using handwriting. If the character recognised by the recognition processor is incorrect, the user is provided with a rapid indication of this effect and so can correct the incorrect character.

In some arrangements the estimated character may be displayed at a position proximate to a location where the user has written a character until the user indicates that the next character is being input. The indication might be for example, the user touching the screen after the previous character has been input, to begin writing the next input. However, embodiments of the present invention provide an arrangement in which the estimated character is displayed at the proximate position for a predetermined persistence time. The predetermined persistence time maybe of sufficient length that the appearance of the character does not interfere with a rate of writing characters on the touch sensitive screen, but remains for long enough for a human user to detect the displayed character. For example, the predetermined persistence time may be between a range of 0.05 to 0.2 seconds.

Various further aspects and features of the present invention are defined in the appended claims. Other aspects of the invention include a personal digital assistant, a mobile communications device and a method for inputting hand written text and a computer program.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF THE EXAMPLE EMBODIMENTS

Embodiments of the present invention provide an arrangement for facilitating entry of text information by writing by hand the characters of the text on a touch sensitive screen. Example devices where embodiments of the present invention find application are illustrated in FIGS. 1 and 2.

Figure 1:
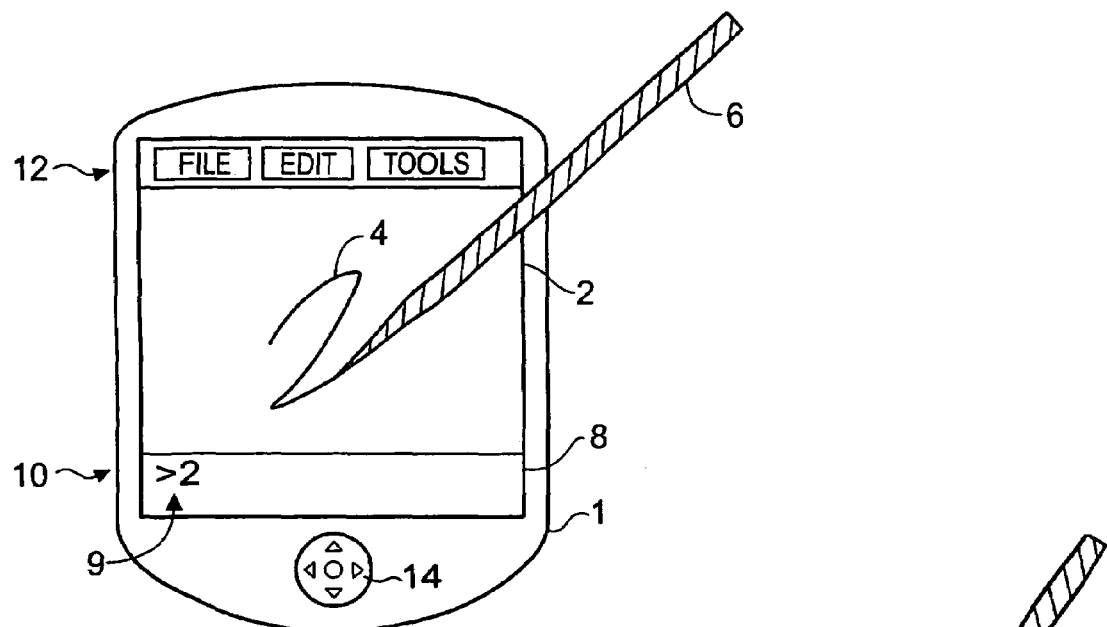
FIG. 1 is a schematic block diagram of a personal digital assistant provided with a user interface for inputting text characters by writing.

FIG. 1 provides a schematic representation of a personal digital assistant (PDA) 1, which provides a user interface through which text information may be entered by handwriting. A touch sensitive screen 2 is provided for recognising the strokes of a pen, a finger, a wand or other implement. The strokes of the pen or finger are recognised by a character recognition processor and an estimate of the character is generated. For the example shown in FIG. 1 a numeral "2" 4 is written on the touch sensitive screen 2 using a tablet pen 6. The PDA 1 is arranged to recognise the numeral "2" and generate within a text dialog box 8 at a position 9 the character for the number "2" which has been recognised. As shown within the text dialog box 8 the number "2" is recognised and appears on an input line 10 of the text input box 8.

Some example PDAs are also provided with a windows type interface providing a selection of menus on a menu bar 12 and may include a further input key or keys 14.

Figure 2:
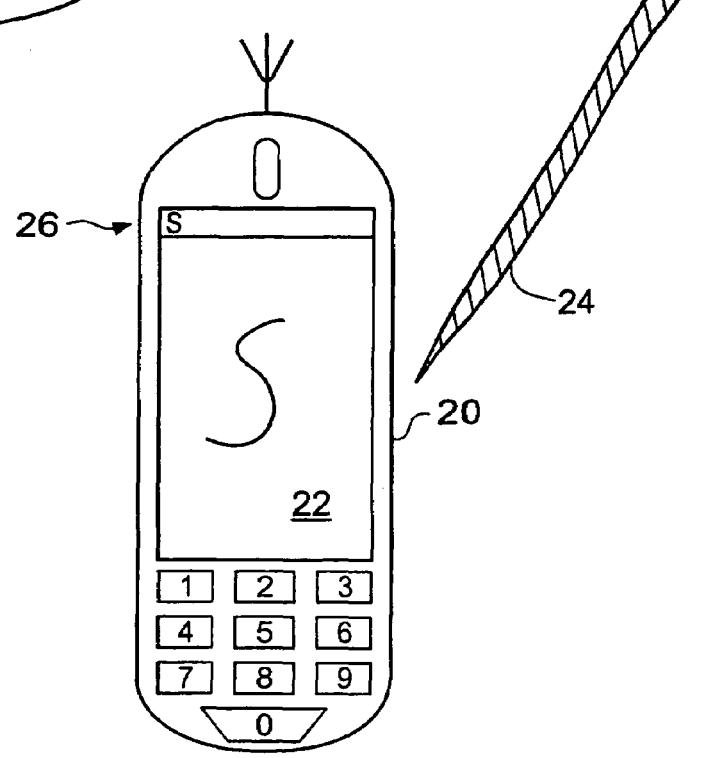
FIG. 2 is a schematic block diagram of a mobile radio telephone provided with a user interface for inputting text characters by writing.

FIG. 2 provides an illustrative representation of a mobile radio-telephone 20 which includes a touch sensitive screen 22 on which a user may input text information comprising characters which are written on the screen 22 using for example a finger or a tablet pen 24. As for the example shown in FIG. 1, a character recognised by a character recognition processor within the mobile radio telephone 20 is estimated from the strokes of the tablet pen on the touch sensitive screen 22 and displayed on an input box 26.

It will be understood however from the example applications shown in FIGS. 1 and 2 that after the user has written a character on the touch sensitive screen 22 the user must shift his attention to the text input box 10, 26 of the PDA or the mobile radio telephone in order to receive confirmation that a character which has been input has been correctly estimated by the character recognition processor. As such the rate at which text may input can be reduced by a requirement for the user to shift his attention from the position where text is written to the position where the text input box reproduces the estimated recognised character.

Figure 3:
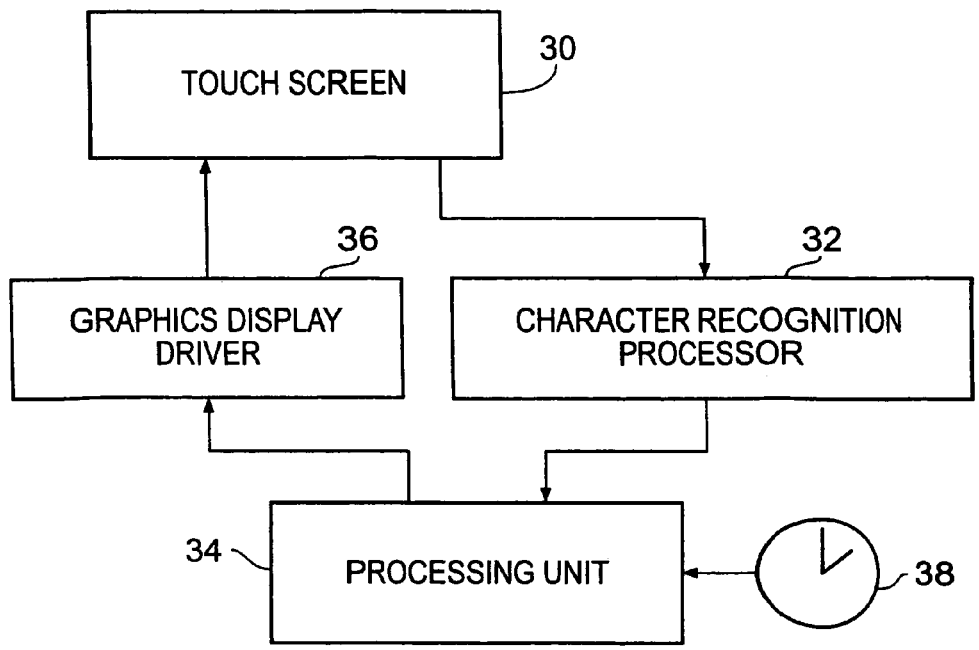
FIG. 3 is a schematic block diagram of a data processing apparatus according to an embodiment of the present invention.

An example block diagram of a data processing apparatus embodying the present invention is provided in FIG. 3. In FIG. 3 a touch sensitive screen 30 is arranged to receive input data via the strokes of a finger or tablet pen. Data representing the strokes of the tablet pen are fed to a character recognition processor 32. The character recognition processor 32 is operable to generate an estimate of the character hand written on the touch screen 30. The estimated character recognised by the character recognition processor 32 is fed to a data processing unit 34. The data processing unit 34 operates in combination with a graphics display driver 36 to represent the character estimated by the character recognition processor 32 on the touch sensitive screen 30.

The arrangement of the data processing apparatus shown in FIG. 3 as described so far corresponds substantially to an arrangement for generating text information in accordance with a conventional arrangement.

A technical problem addressed by embodiments of the present invention as mentioned above, relates to the fact that conventional data processing apparatus arranged to generate text information from a hand written input requires the user to shift his or her focus of attention from a place where the characters are written to the place where the estimate of the written character as generated by the character recognition processor 32 is displayed within the text input box. Such a conventional arrangement is shown more specifically in FIGS. 4 and 5.

Figures 4, 5:
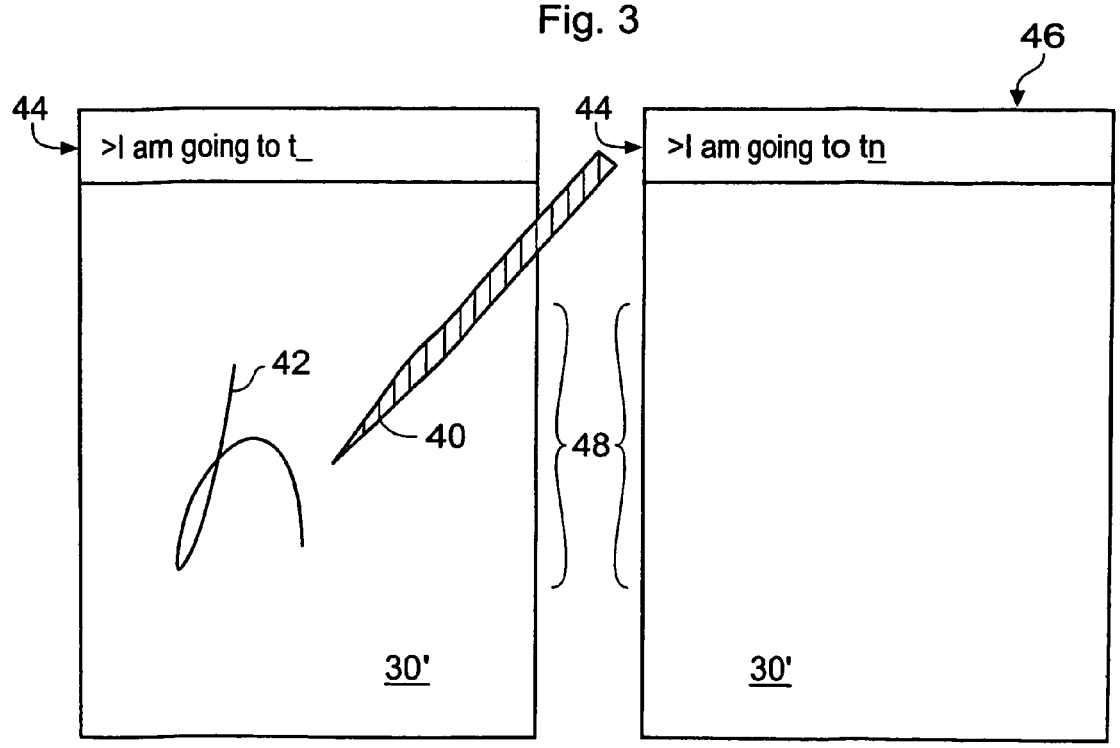
FIG. 4 is a block diagram of an example of a touch display screen illustrating a problem addressed by embodiments of the present invention.
FIG. 5 is a block diagram showing a further state of the screen shown in FIG. 4.

In FIG. 4 a tablet pen 40 is used to write a character 42 on a touch sensitive screen 30. In accordance with the data processing apparatus illustrated in FIG. 3 the character recognition processor 32 detects from the data representing the movement of the strokes of the tablet pen 40, a match of the hand written character to a corresponding letter of the alphabet or number referred to hereinafter as an alpha-numeric character. The character recognition processor therefore generates an estimate of the hand written character, which is then reproduced within the text input box 44. As illustrated for the present example the user is inputting a phrase "I am going to the pub".

As will be appreciated the character recognition processor 32 is limited in the accuracy with which it can detect a hand written character. That is to say a text character estimated as corresponding to the hand written character may not actually correspond with that intended and therefore written by the user. As a result when inputting text information using conventional handwriting recognition data processing apparatus the character recognition processor 32 may incorrectly interpret a hand written character as a different character than that intended. As such and as illustrated in FIG. 5 although the user intended to write the letter "h" as the second letter of the word "the", the character recognition processor detected the letter as the letter "n" as illustrated in the text input box at the input character position shown by an arrow 46. According to a conventional operation the user then has to input a backspace or a "delete character" command such as moving the pen horizontally from right to left in order to delete the incorrect character and re-input this character.

As explained above, in accordance with conventional arrangements the recognised hand written character is reproduced in a dialog box 44 which is displaced from a location where the hand written character is actually input on the touch sensitive screen. As a result the user has to continually shift his focus of attention from the area where the text is written as represented by an illustrated space 48 in FIGS. 4 and 5 to the text input box 44. This can represent a hindrance in the process of inputting text information.

Figure 6:
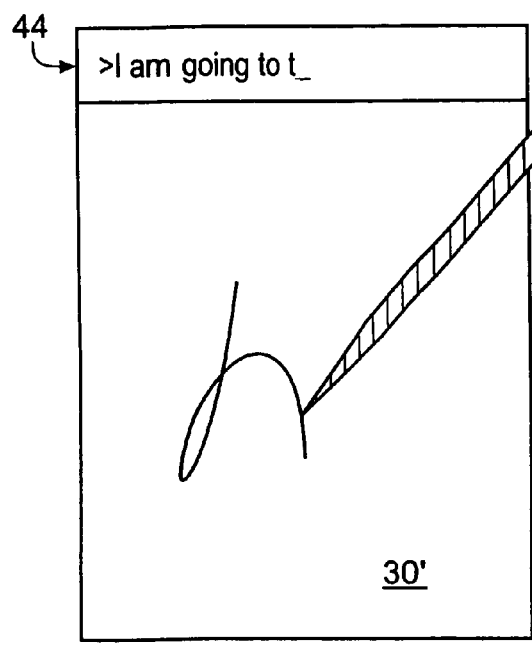
FIG. 6 is a block diagram of an example of a touch sensitive display screen illustrating an embodiment of the present invention.

FIGS. 6, 7, 8 and 9 provide an illustrative representation of the operation of the data processing unit shown in FIG. 3 in accordance with the present technique. In FIG. 6 the tablet pen 40 is used to write a character on the touch sensitive screen 30. As before the character recognition processor 32 is operable to generate an estimate of the hand written character and to reproduce the character in the input text box 44. The example shown in FIGS. 4 and 5 is correspondingly illustrated in FIGS. 6 and 7 for the example in which the character recognition processor incorrectly interprets the letter "h" as the letter "n". However, unlike the arrangement shown in FIGS. 4 and 5, the processing unit 34 which is arranged to operate in accordance with the present technique generates a representative of the character recognised by the character recognition processor 32 which is reproduced as shown in FIG. 6 substantially in the area where the user wrote the desired letter 48. As such the user is provided with a confirmation of the letter recognised by the character recognition processor 32 without requiring a shift in his or her attention from the area of input 48 to the text input box 44. As a result therefore text maybe input using the data processing apparatus in a more efficient manner.

Figure 7:
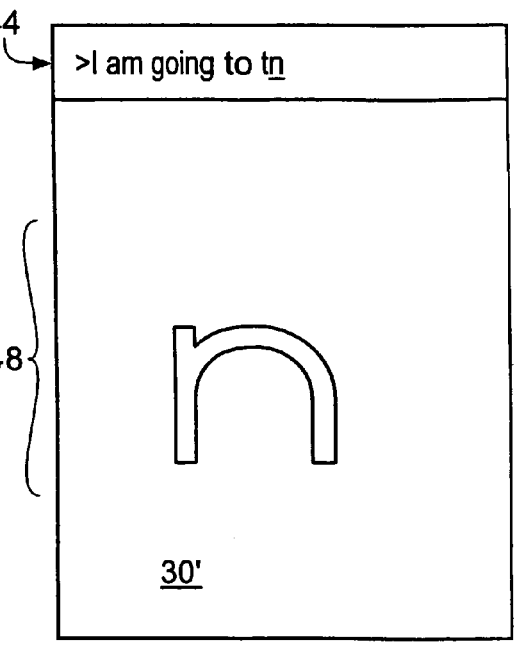
FIG. 7 is a block diagram showing a further state of the screen shown in FIG. 6.
Figure 8:
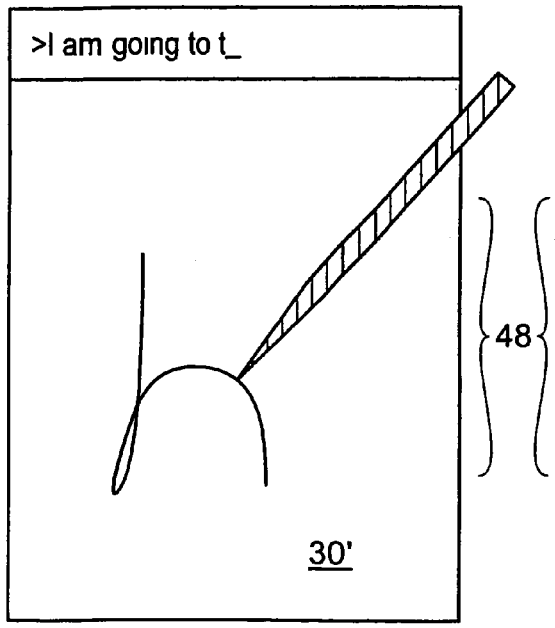
FIG. 8 is a block diagram showing a further state of the screen shown in FIG. 6.
Figure 9:
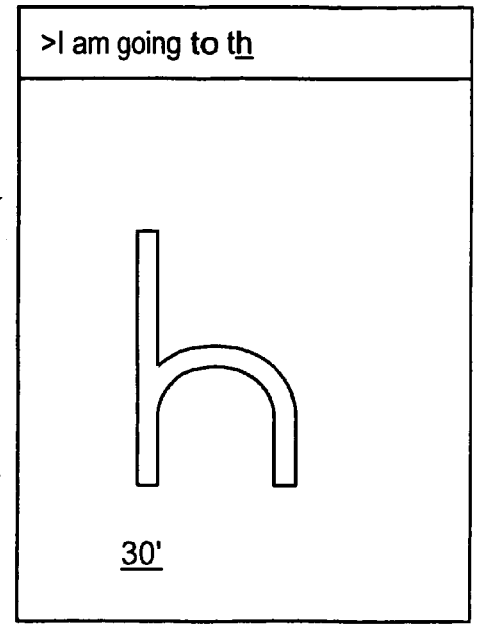
FIG. 9 is a block diagram showing a further state of the screen shown in FIG. 6.

According to the illustration shown in FIGS. 4 and 5, the character recognised by the character recognition processor 32 from the pen strokes illustrated in FIG. 6 was the letter "n" as illustrated in FIG. 7. Accordingly, without shifting the focus of attention the user can execute a backspace character to delete the letter "n", and as shown in FIGS. 8 and 9 re-draw the desired letter "h". Accordingly, and as shown in FIG. 9 the character recognition processor then correctly recognises the letter "h" which is again reproduced approximately at a position on the display screen 30 to the position where the user hand wrote the desired character "h" 48.

In some embodiments the recognised character reproduced in the position 48 proximate the hand written input of that character is of substantially the same size as the character written by the user. Accordingly, the user is provided with a satisfactory identification of the letter as would be produced if the user was actually writing the characters by hand.

In one example the estimated character reproduced in a position approximate to the position where the user entered the hand written character is maintained indefinitely until the user again applies the tablet pen to the touch screen to input the next character. However, according to example embodiments the character is maintained for a predetermined persistence period as confirmation of the estimate of the character input by the user. The predetermined persistence period is arranged according to certain criteria to be long enough to allow a user to identify the estimated character but short enough not to hinder a user from inputting a subsequent character. For example, it has been found that a persistence period of between 0.05 to 0.2 seconds fulfils the desired criteria. To this end the data processing apparatus is provided with a clock 38 for determining the predetermined persistence period.

Summary of Operation

Figure 10:
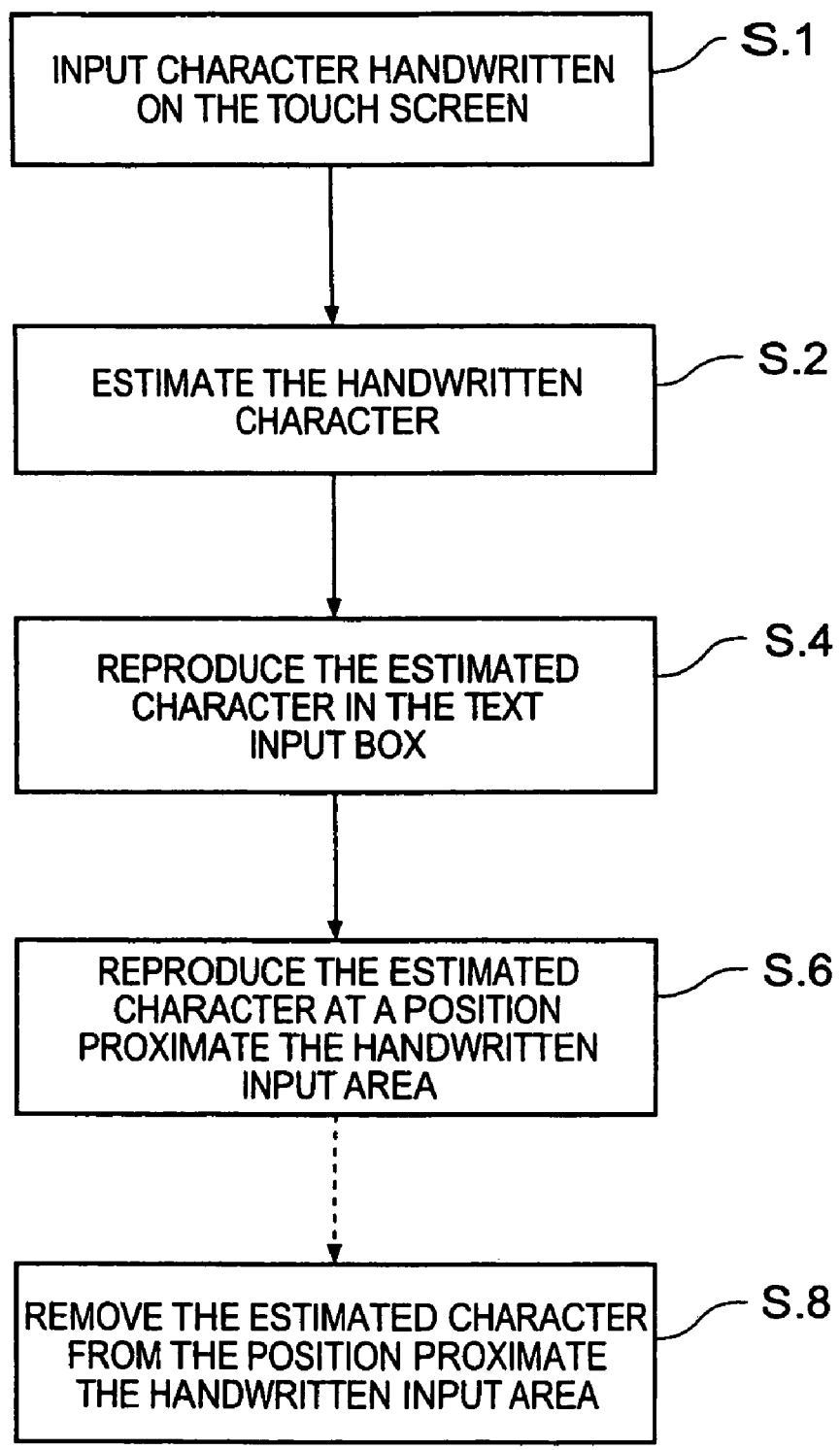
FIG. 10 is a flow diagram illustrating a method for inputting data by hand writing characters.

FIG. 10 provides a flow diagram illustrating the operation of the data processing apparatus shown in FIG. 3. A summary of the steps performed by the process is as follows:

S1: The user hand writes a character on the touch sensitive screen.

S2: The character recognition processor 32 generates an estimate of the hand written character input in step S1.

S4: The estimated character is reproduced in the text box 44 of the screen 30.

S6: The estimated character is reproduced at a position approximate the hand written input area 48 as a confirmation to the user of the recognised character. The estimated character is reproduced in a position which does not require the user to shift his or her attention to another location in order to receive confirmation of the detected and estimated character.

S8: The estimated character may be removed from the position proximate the hand written input area after a predetermined persistence period. The persistence period may be set such that the user is not discouraged from inputting the next character but can still recognise the character, which has been detected.

Figure 11:
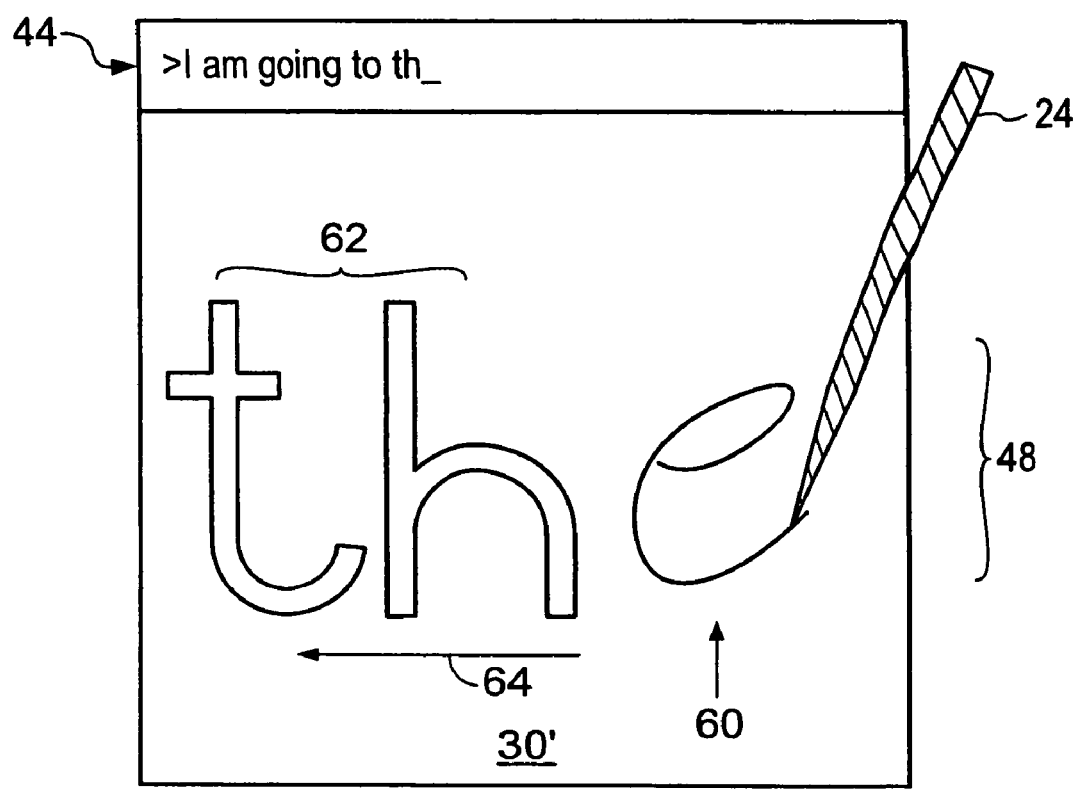
FIG. 11 is a schematic block of a touch sensitive display screen illustrating a further embodiment of the invention.

In other embodiments the estimated characters which are reproduced at a position proximate the location of their hand written entry are scrolled with the effect that the user adds a subsequent character as the previous character is moved to model an effect of writing by hand across a page. An example illustration is provided in FIG. 11 for the example data processing unit illustrated in FIG. 3. As shown in FIG. 11, as a new character 60 is being written on the display screen, characters 62 which have been already recognised are scrolled to the left as represented by an arrow 64. Accordingly, a further enhancement is provided in the facility for inputting text information using handwriting.

It will be appreciated that the examples of the present technique described above are not limiting to the present invention and for example any type of characters maybe recognised and reproduced according to this technique. The technique is not limited to arabic or roman numerals and characters but may be extended to Chinese, Japanese or Greek characters or indeed any other language known to man.

Various modifications may be made to the embodiments herein before described without departing from the scope of the present invention. It will be appreciated that an aspect of the present invention is a computer program, which when used to program a data processor, causes the data processor to operate to recognise characters and to display the characters at a position proximate the location of a position at which the hand written character was input.

The invention claimed is:

1. A personal digital assistant including a data processing apparatus for inputting data by hand writing characters on a touch sensitive display screen, the data processing apparatus comprising a character recognition processor operable to generate an estimate of an input character handwritten by a user on a handwriting area of the touch sensitive screen, wherein the handwriting area is in a first location of the display screen, a processing unit operable to receive the estimated character generated by the character recognition processor, and a graphics display driver operable to receive the estimated character from the processing unit and to display the estimated character within a text input window of the display screen, wherein the text input window is displayed in a second location of the display screen, the second location different than the first location, wherein the processing unit is operable in combination with the graphics display driver to display the input character as it is being handwritten by the user, to replace the input character with the estimated character displayed on the display screen, substantially at a position where the input character was written in the handwriting area in the first location of the display screen for a predetermined persistence time, the predetermined persistence time being limited, and to display the estimated character in the text input window after the predetermined time has elapsed, and to display a plurality of estimated characters in the position proximate to where previous characters have been written in the first location of the display screen, the previously written and estimated characters being scrolled with respect to a current character to model an effect of writing by hand across a page.

2. A mobile communications device, including a data processing apparatus for inputting data by hand writing characters on a touch sensitive display screen, the data processing apparatus comprising
- a character recognition processor operable to generate an estimate of an input character handwritten by a user on a handwriting area of the touch sensitive screen, wherein the handwriting area is in a first location of the display screen,
- a processing unit operable to receive the estimated character generated by the character recognition processor, and
- a graphics display driver operable to receive the estimated character from the processing unit and to display the estimated character within a text input window of the display screen, wherein the text input window is displayed in a second location of the display screen, the second location different than the first location, wherein the processing unit is operable in combination with the graphics display driver
- to display the input character as it is being handwritten by the user,
- to replace the input character with the estimated character displayed on the display screen, substantially at a position where the character was written in the handwriting area in the first location of the display screen for a predetermined persistence time, the predetermined persistence time being limited, and
- to display a plurality of estimated characters in the position proximate to where previous characters have been written in the first location of the display screen, the previously written and estimated characters being scrolled with respect to a current character to model an effect of writing by hand across a page.

3. A mobile communications device as claimed in claim 2, wherein the device is a mobile radio telephone.

4. A method for inputting data by hand writing characters on a touch sensitive display screen, the method comprising
- generating an estimate of an input character written by a user on a handwriting area of the touch sensitive screen, wherein the handwriting area is in a first location of the display screen, and
- displaying the estimated character within a text input window of the display screen, wherein the text input window is displayed in a second location of the display screen, the second location different than the first location, wherein the displaying comprises
- displaying the input character as it is being handwritten by the user,
- replacing the input character with the estimated character on the display screen substantially where the input character was written in the handwriting area in the first location of the display screen for a predetermined persistence time, the predetermined persistence time being limited,
- after the predetermined time has elapsed displaying the estimated character in the text window, and
- displaying a plurality of estimated characters in the position proximate to where previous characters have been written in the first location of the display screen, the previously written and estimated characters being scrolled with respect to a current character to model an effect of writing by hand across a page.

5. A method as claimed in claim 4, wherein the predetermined persistence time for which the estimated character is displayed to a user has an effect that the appearance of the character does not interfere with a rate of writing characters on the touch sensitive screen, but remains for long enough for a human user to detect the displayed character.

6. A method as claimed in claim 5, wherein the predetermined persistence time is substantially in the range between 0.05 to 0.2 seconds.

7. A method as claimed in claim 4, wherein the displaying comprises displaying the estimated character for the predetermined persistence time in the proximate position to where the character has been written with the effect that a size of the estimated character substantially corresponds with the size of the character as written.

8. A computer program providing computer executable instructions, stored on a computer readable medium, which when loaded on to a data processor causes the data processor to perform a method for inputting data by hand writing characters on a touch sensitive display screen, the method comprising
- generating an estimate of an input character written by a user on a handwriting area of the touch sensitive screen, wherein the handwriting area is in a first location of the display screen, and
- displaying the estimated character within a text input window of the display screen, wherein the text input window is displayed in a second location of the display screen, the second location different than the first location, wherein the displaying comprises
- displaying the input character as it is being handwritten by the user,
- replacing the input character with the estimated character on the display screen substantially where the input character was written in the handwriting area in the first location of the display screen for a predetermined persistence time, the predetermined persistence time being limited,
- after the predetermined time has elapsed displaying the estimated character in the text input window, and
- displaying a plurality of estimated characters in the position proximate to where previous characters have been written in the first location of the display screen, the previously written and estimated characters being scrolled with respect to a current character to model an effect of writing by hand across a page.

9. A medium bearing information representing the computer program claimed in claim 8.

10. An apparatus for inputting data by hand writing characters on a touch sensitive display screen, the apparatus comprising
- means for generating an estimate of an input character written by a user on a handwriting area of the touch sensitive screen, wherein the handwriting area is displayed in a first location of the display screen, and
- means for displaying the estimated character within a text input window of the display screen, wherein the text input window is in a second location of the display screen, the second location different than the first location, wherein the means for displaying comprises
- means for displaying the input character as it is being handwritten by the user,
- means for replacing the input character with the estimated character on the display screen substantially where the input character was written in the handwriting area in the first location of the display screen for a predetermined persistence time, the predetermined persistence time being limited and after the predetermined time has elapsed displaying the estimated character in the text input window, and means for displaying a plurality of estimated characters in the position proximate to where previous characters have been written in the first location of the display screen, the previously written and estimated characters being scrolled with respect to a current character to model an effect of writing by hand across a page.

11. A data processing apparatus for inputting data by hand writing characters on a touch sensitive display screen, the data processing apparatus comprising a character recognition processor operable to generate an estimate of an input character handwritten by a user on a handwriting area of the touch sensitive screen, wherein the handwriting area is in a first location of the display screen, a processing unit operable to receive the estimated character generated by the character recognition processor, and a graphics display driver operable to receive the estimated character from the processing unit and to display the estimated character within a text input window of the display screen, wherein the text input window is displayed in a second location of the display screen, the second location different than the first location, wherein the processing unit is operable in combination with the graphics display driver to display the input character as it is being handwritten by the user, to replace the input character with the estimated character displayed on the display screen, substantially at a position where the input character was written in the handwriting area in the first location of the display screen for a predetermined persistence time, the predetermined persistence time being limited, and to display the estimated character in the text input window after the predetermined persistence time has lapsed, and to display a plurality of estimated characters in the position proximate to where previous characters have been written in the first location of the display screen, the previously written and estimated characters being scrolled with respect to a current character to model an effect of writing by hand across a page.

12. A data processing apparatus as claimed in claim 11, wherein the predetermined persistence time for which the estimated character is displayed, has an effect that the appearance of the character does not interfere with a rate of writing characters on the touch sensitive screen, but remains for long enough for a human user to detect the displayed character.

13. A data processing apparatus as claimed in claim 12, wherein the predetermined persistence time is substantially in a range of between 0.05 to 0.2 seconds.

14. A data processing apparatus as claimed in claim 11, wherein the estimated character displayed for the predetermined persistence time in the proximate position to the location where the character has been written by hand, has a size which substantially corresponds with the size of the character as written.

* * * * *